(12) United States Patent
Gronwald

(10) Patent No.: US 9,422,910 B2
(45) Date of Patent: Aug. 23, 2016

(54) SYSTEM AND METHOD FOR LIMITING A STARTING CURRENT

(75) Inventor: Frank Gronwald, Bedburg (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 156 days.

(21) Appl. No.: 14/004,735

(22) PCT Filed: Feb. 15, 2012

(86) PCT No.: PCT/EP2012/052581
§ 371 (c)(1),
(2), (4) Date: Oct. 21, 2013

(87) PCT Pub. No.: WO2012/123204
PCT Pub. Date: Sep. 20, 2012

(65) Prior Publication Data
US 2014/0035292 A1 Feb. 6, 2014

(30) Foreign Application Priority Data

Mar. 15, 2011 (DE) .......................... 10 2011 014 023

(51) Int. Cl.
*F02N 11/08* (2006.01)
*B60R 16/03* (2006.01)
*F02N 11/10* (2006.01)

(52) U.S. Cl.
CPC .............. *F02N 11/087* (2013.01); *B60R 16/03* (2013.01); *F02N 11/0814* (2013.01); *F02N 11/10* (2013.01)

(58) Field of Classification Search
CPC ... F02N 11/087; F02N 11/0814; F02N 11/10; B60R 16/03

USPC .......... 290/38 R, 38 C; 310/68 R; 123/179.25
See application file for complete search history.

(56) References Cited

U.S. PATENT DOCUMENTS 5,402,758 A * 4/1995 Land et al. ................. 123/179.3
5,877,563 A   3/1999 Krappel et al. .............. 307/10.1
(Continued)

FOREIGN PATENT DOCUMENTS

DE 19503809 8/1996 ............. B60R 16/02
DE 19810954 9/1999 ............. F02N 11/08
(Continued)

OTHER PUBLICATIONS

German Patent Office, German Office Action, Application No. 102011014023.9, dated Dec. 6, 2011, 7 pages.
(Continued)

*Primary Examiner* — Tulsidas C Patel
*Assistant Examiner* — Viet Nguyen
(74) *Attorney, Agent, or Firm* — Sunstein Kann Murphy & Timbers LLP

(57) ABSTRACT

For the electrical protection of a current control device 12 against overcurrents, a starting current limitation system is proposed with a first electrical connection 4 connectable to a motor vehicle battery pole 9, a second electrical connection 6 connectable to a starter 10, and a parallel circuit connected between the first connection 4 and the second connection 6, comprising a branch with a current control device 12 and a branch with an electrical resistor 14, in such a way that, at the beginning of a warm start of the motor vehicle, a starter current is conducted via the resistor 14 and that, after the beginning of the warm start, the starter current is conducted via the current control device 12 and the resistor 14.

17 Claims, 7 Drawing Sheets

(56) References Cited

U.S. PATENT DOCUMENTS

| | | | |
|---|---|---|---|
| 6,417,579 B1 | 7/2002 | Lehnst et al. | 307/10.7 |
| 7,508,172 B1 * | 3/2009 | Nishimura et al. | 322/37 |
| 8,779,609 B2 * | 7/2014 | Poisson | 290/38 R |
| 8,896,140 B2 | 11/2014 | Venkatasubramaniam et al. | 290/38 R |
| 2004/0168664 A1 | 9/2004 | Senda et al. | 123/179.3 |
| 2011/0115238 A1 * | 5/2011 | Biessenberger et al. | 290/38 R |
| 2012/0126547 A1 * | 5/2012 | Dooley | H02P 7/282 290/38 R |
| 2012/0186551 A1 | 7/2012 | Rentschler et al. | 123/179.3 |
| 2012/0200093 A1 * | 8/2012 | Venkatasubramaniam et al. | 290/38 R |
| 2012/0313381 A1 * | 12/2012 | Pelaez et al. | 290/38 R |
| 2013/0229019 A1 * | 9/2013 | Rettig et al. | 290/38 R |

FOREIGN PATENT DOCUMENTS

| | | | |
|---|---|---|---|
| DE | 19854953 | 9/2000 | B60R 16/02 |
| DE | 102008002098 | 12/2009 | F02N 11/08 |
| DE | 10 2008 043 546 | 5/2010 | F02N 11/08 |
| DE | 102008043546 | 5/2010 | F02N 11/08 |
| DE | 102009028294 | 2/2011 | F02N 11/08 |
| DE | 102009047635 | 2/2011 | H02P 1/18 |
| DE | 102010029919 | 9/2011 | F02N 11/08 |
| GB | 2 383 905 | 7/2003 | F02N 11/08 |
| WO | WO 2009138346 A1 * | 11/2009 | |
| WO | WO 2009/144185 | 12/2009 | H01H 50/54 |
| WO | WO 2011/018275 | 2/2011 | F02N 11/08 |
| WO | WO 2011018275 A1 * | 2/2011 | |
| WO | WO 2011/110445 | 9/2011 | F02N 11/08 |
| WO | WO 2012/048969 | 4/2012 | F02N 11/08 |

OTHER PUBLICATIONS

International Searching Authority, International Search Report—International Application No. PCT/EP2012/052581, dated Feb. 15, 2012, together with the Written Opinion of the International Searching Authority, 9 pages.

State Intellectual Property Office of P.R.C., Notification of the First Office Action—Application No. 201280018565.1, dated Jul. 1, 2015, 12 pages.

* cited by examiner

SYSTEM AND METHOD FOR LIMITING A STARTING CURRENT

TECHNICAL FIELD

The subject-matter relates to a starting current limitation system and a method for operating a starting current limitation system of this type, and also the use of a starting current limitation system.

BACKGROUND ART

Discussion of potential savings in fuel consumption of motor vehicles frequently mentions the automatic start/stop system. In this system, the internal combustion engine of the vehicle is automatically switched off during longer-lasting idling periods. If the user wishes to continue driving, he merely presses the accelerator pedal and the engine restarts automatically.

In a procedure of this type, referred to as a warm start, the electric starter motor of the internal combustion engine, referred to as the starter for short, must be driven with a very high power. If only a single battery, e.g. a lead-acid battery or lithium ion battery, is installed in a vehicle, a voltage dip occurs on the battery poles due to the high power requirement. As a result of this voltage dip, auxiliary equipment may not be supplied with sufficient power and may malfunction.

In the warm start, the starter is activated with a stationary armature. Since the starter is normally a series motor, a short circuit occurs via the armature winding. This results in a very high starting current, which may amount to several 100 A. However, the battery voltage on the battery poles normally dips at this time. This is also described, for example, in DIN 40839, which shows the voltage characteristic of the on-board supply voltage in a start-up curve.

In order to prevent malfunctions in the auxiliary equipment, such as, for example, navigation systems, car radios, telecommunication systems, air conditioning systems and the like, it is already proposed in the prior art to limit the starting current for a warm start. In particular, it is already proposed to operate the auxiliary equipment via a so-called back-up battery. This technology is known, for example, from DE 10 2007 062 955 A1. However, it is necessary here to trigger both the back-up battery and the main battery. Furthermore, the back-up battery increases the weight of the vehicle as a whole.

For this reason, the subject-matter was based on the object of providing a starting current limitation which provides maximum convenience with little structural outlay.

SUMMARY OF THE INVENTION

It has been recognised that the use of only one current control device is not sufficient. In fact, the use of only one current control device, which preferably has semiconductor switches, in the case of a warm start may result in a short-circuit within the semiconductor switches. The reason for this is that, in the case of a warm start, if the starter current flows entirely via the semiconductor switches, the latter can be overloaded. Particularly in the case of starter currents of more than 500 A, conventional semiconductor switches can become short-circuited. To prevent this, the use of a very expensive power semiconductor switch would be necessary, which is to be avoided on cost grounds.

In order to enable a starting current limitation which simultaneously requires few components and enables the use of current control devices, it is proposed that a first connection is formed to the connection on a motor vehicle battery pole.

A second connection can be connectably formed for the connection to a starter, in particular an electric starter motor of the motor vehicle.

The starting current is then limited in that a parallel circuit comprising a branch with a current control device and a branch with an electrical resistor is disposed between the first connection and the second connection. With this parallel circuit, it is possible to conduct the starter current via the resistor at the beginning of the warm start. The starting current is preferably conducted entirely via the resistor. The resistor acts as a current limiter. Since, as already explained above, the armature winding is short-circuited in the event of a start, a short circuit of the battery poles would occur without a resistor, resulting in a battery voltage dip. After the beginning of the warm start, i.e. when the armature winding has begun to rotate, the starter current can additionally be conducted via the current control device, i.e. after a short start-up period, the current control device, which was initially open, can be at least temporarily closed.

The starting current can be controlled and regulated by means of the current control device. Since the current control device is connected only after the beginning of the start process, a short-circuit can be prevented, since the current peaks reached at the beginning of the start process are no longer reached in the subsequent start process.

The resistor is preferably a low-value resistor which is sufficiently dimensioned to limit the starting current, preferably to less than 1000 A, preferably less than 800 A, particularly preferably to less than 500 A. The level of the starting current normally depends on the internal resistance of the armature winding and the exciter winding and the level of the resistance.

According to one embodiment, it is proposed that the current control device is open at the beginning of the warm start and/or that the current control device is at least temporarily closed at the beginning of a cold start. The current control device should be open at least at the beginning of a warm start, so that the current flows from the battery to the starter entirely via the resistor. This prevents the starting current from becoming too great and auxiliary equipment from being impeded in its function. Since the starting current is limited by the resistor, a voltage dip does not occur on the battery poles and the auxiliary equipment can continue to draw its required power.

On the other hand, in the case of a cold start, i.e. when no auxiliary equipment has yet been activated, the starting current can also flow via the current control device. Since the resistor is connected in parallel to the current control device, no damage to the current control device, such as, for example, a short-circuiting of the semiconductors, occurs here either, since a part of the starting current flows over the resistor and the current-carrying capacity of the current control device is thus not unduly loaded.

A warm start will frequently be used in start-stop technology. A warm start is a start which is carried out when the engine was running a short time beforehand. A warm start can occur particularly when less than 10 minutes, in particular less than 5 minutes, preferably less than 1 minute, has elapsed since the engine was switched off.

Conversely, a cold start is an engine start in which the engine was not previously in operation. A cold start is involved particularly in the case of time periods of more than 15 minutes since the last operation of the engine.

According to one embodiment, it is proposed that the current control device is at least temporarily closed following the beginning of the warm start, in particular after at least 10 ms, preferably at least 30 ms, particularly preferably at least 40 ms. In the case of the warm start, a high armature current is to be expected. As soon as the starter has been set in motion, i.e. immediately after the beginning of the start process, the expected current peak is overpassed. The current control device can then be connected, i.e. closed. Current thus flows via both the resistor and the current control device, since both of these are connected in parallel.

The connection of the current control device can take place after 50 ms at the latest. At the end of a very short time, there is no longer any risk for the semiconductors in the current control device or for the functional capability of the auxiliary equipment.

The term "at least temporary closure" can be understood to mean that the current control device is not permanently closed. In particular, as will be described below, the current control device can be operated using pulse width modulation (PWM). In this case, the circuit can be closed and opened in a pulsed manner. The energy transmitted via the current control device can be limited by means of the pulse widths.

According to one embodiment, it is proposed that the current control device has at least one semiconductor, preferably a power semiconductor. One or more semiconductor switches, in particular transistors or thyristors, can be considered for the current control device. The semiconductor switches can be connected in parallel with one another.

The current control device can be operated in a linear mode after the beginning of the warm start. In this mode, the current can be set linearly by the semiconductor. A pulsed operation of the current control device can also be provided after the beginning of the warm start. In pulsed mode, the current control device is opened and closed for different pulse widths. The energy transmitted via the current control device can be set by means of the pulse widths.

According to one embodiment, it is proposed that the branch with the resistor has entirely passive components. The intended result is that an active control in the resistor branch can be dispensed with. This results in substantially reduced costs for the production and operation of the starting current limitation system. Furthermore, a resistor can be equipped with a very high current-carrying capacity and can thus be used for high starting currents also. Finally, a resistor is usable in continuous mode and signs of wear are virtually non-existent.

The resistor is preferably made from a resistor material. Particularly if a voltage measurement is to be carried out via the resistor, as will be shown below, the resistor material may be formed, for example, from manganin. In this case, the resistor can be formed as a shunt. The resistor can also be formed as an electrical cable, which can be connected electrically in parallel with the current control device. The resistor can be set depending on the selection of the cable cross section and cable length. The current flowing in the event of a start can be limited by the setting of the resistor.

According to one embodiment, it is proposed that the branch with the resistor is connected in parallel with the current control device with an inductance of less than 500 mH, preferably less than 100 mH, particularly preferably less than 50 mH. The arrangement of the branch with the resistor parallel to the current control device, particularly their spatial arrangement in relation to one another, is decisive for the inductance of the parallel circuit. Due to the fact that the current control device can also be operated in a pulsed mode, oscillation processes occur in the parallel circuit between the resistor and the current control device. The magnitude of these oscillation processes increases proportionally to the level of the inductance of the current loop.

For this reason, it is proposed to connect the resistor to the current control device with minimal inductance, i.e. the circuit formed from the resistor and the current control device is to have the lowest possible inductance. During the pulsed operation, voltages U occur in the oscillating circuit in the order of magnitude of $U=-(I/(t)$, where L represents the inductance of the circuit and I represents the current through the parallel circuit. In pulsed mode, high current fluctuations occur within the shortest time, so that very high voltages may occur. To minimise these, the inductance L of the circuit must be low.

According to one embodiment, it is proposed that the resistor has a current-carrying capacity of more than 100 A, preferably more than 250 A, preferably more than 500 A. Due to the fact that the resistor is designed for a high current-carrying capacity, a very high current can flow via the resistor at the beginning of the warm start process without the resistor being destroyed. Due to the fact that the high current flows via the resistor, whereas the current control device is initially deactivated and open, damage to the current control device is prevented. After a while, i.e. when the starter has started up, the current control device can be connected, since the current peak has been overpassed and only smaller currents still flow.

According to one embodiment, which is already inventive per se, it is proposed that an active disconnecting element, preferably a pyrotechnic disconnecting element or semiconductor switch, is disposed in series with the parallel circuit between the connections or between the first connection and the motor vehicle battery pole. Unlike a fuse, which is passive, an active disconnecting element can be activated by an external trigger signal. In particular, a pyrotechnic disconnecting element or power semiconductor is particularly suitable for this purpose, since the latter is triggered very quickly and very safely. Using the disconnecting element, it is possible to disconnect the starter battery line from the battery in the event of a crash, so that sparking in the area of this line can be prevented.

As already explained above and claimed according to one embodiment, the disconnecting element can disconnect the electrical connection to the battery pole depending on a trigger signal. This guarantees that the trigger signal enables a disconnection of the starter battery line from the battery pole. This results in a higher safety, particularly in the event of a crash.

According to one embodiment, it is proposed that the trigger signal is receivable by an airbag control device. In the event of a crash, an airbag control device can emit a trigger signal which can result in activation of the disconnecting element, in particular in the ignition of the pyrotechnic disconnecting element.

It is also possible for a requirement-based disconnection to take place only in the event of a short circuit in the area of the starter battery line. This is possible, for example, when the trigger signal is emitted depending on a voltage measuring device measuring the voltage via the resistor. The resistor may be a shunt. If the resistor is a shunt, the voltage over the resistor can be measured very precisely. Since only the current flowing from the battery to the starter flows over the resistor, a short circuit in the area of the starter cable can be detected via this resistor, since the current over the resistor is then high and the voltage drop is similarly correspondingly high. If the voltage exceeds a limit value, a short circuit can be inferred.

According to one embodiment, the trigger signal can additionally be dependent on a start signal, preferably a terminal 50 signal. In the event of a start, particularly in the event of a warm start, but also in the event of a cold start, very high currents flow over the resistor, particularly at the time of the start. These result in a high voltage drop which normally exceeds the limit value, as a result of which the trigger signal would be emitted. However, this high current may be reached if a start signal is present. It is therefore possible to link the occurrence of the start signal in a NAND operation to the limit value of the voltage. This means that, if the start signal is present, a trigger signal is not triggered in any event, even if the voltage limit value is exceeded. Conversely, if the start signal is not present, the trigger signal is triggered as soon as the voltage exceeds the limit value.

According to one embodiment, it is proposed that the connections, the resistor and the current control device and preferably the disconnecting device are at least partially encapsulated in a common housing. The connections can begin outside the housing and can feed the current path into the housing. The disconnecting device can similarly be disposed in the housing. It is also possible for the disconnecting device to be disposed on one of the connections and to be at least partially outside the housing. The current control device, which normally has semiconductor components, is normally encapsulated in the housing.

A structural space optimisation in the vehicle is achieved if the housing is disposed on or in a pole recess on the motor vehicle battery. In particular, the housing or the connection can be directly connected to a battery pole terminal, so that the starting current limitation system can be disposed directly on the battery.

According to one embodiment, it is proposed that at least one of the connections has a projection, preferably a pot or a cup, in such a way that the projection corresponds to a receptacle of a pyrotechnic disconnecting element. In this case, the connection can directly form part of the pyrotechnic disconnecting element. The connection can be formed so that it can move in relation to the pyrotechnic disconnecting element, in particular can be bent. As a result, the connection can be projected out of the pyrotechnic disconnecting element or the receptacle of the pyrotechnic disconnecting element, wherein the connection then bends and the current path is disconnected.

According to one embodiment, it is proposed that the receptacle of the pyrotechnic disconnecting element forms one piece with a battery pole terminal. This enables a particularly economical and space-saving assembly, since the receptacle of the pyrotechnic disconnecting element can be disposed directly on the battery pole terminal. An igniter can be disposed in the receptacle of the pyrotechnic disconnecting element and the projection of the connection can then be pressed into the receptacle. A particularly safe disconnection is thereby enabled with minimal material outlay.

According to one embodiment, it is proposed that the two connections open out into flat parts, particularly metal sheets or bands, disposed in parallel with one another and electrically isolated from one another via a gap. It is thus possible that both connections are disposed on metal sheets or are formed from metal sheets. A metal sheet of a connection may, for example, be bent at right angles and one leg may have the projection corresponding to the receptacle of the pyrotechnic disconnecting element.

The gap between the two flat parts is preferably filled with in isolator. The flat parts are thereby isolated from one another. The resistor can electrically bridge the gap, so that this establishes an electrical connection between the flat parts and therefore also between the connections. In parallel thereto, the current control device can similarly bridge the flat parts. The flat parts are suitable in particular for the connection of the current control device, since semiconductor switches in particular can be particularly easily mounted and attached hereon. In particular, a plurality of semiconductor switches parallel to one another can contact the two connections with one another via the gap.

It is proposed here that the current control device first opens a connection between the motor vehicle battery pole and the starter at the beginning of a warm start process. In particular, the switches, in particular semiconductor switches in the current control device, are opened so that no current can flow over them. However, it is proposed that the connections are electrically interconnected via a resistor. This resistor is permanently disposed between the connections so that the current can flow only via the resistor at the beginning of a warm start process. After a while, in particular after 30 to 50 ms, the starter has started up and the current peaks are overpassed, so that the current control device can be connected. The current then flows in parallel over the resistor and the switches of the current control device.

By means of the method shown, it is possible, in a particularly simple manner, to protect a current control device against overcurrents and simultaneously guarantee the auxiliary facilities, in particular the power supply of auxiliary equipment, even in the case of a warm start.

It is furthermore proposed that a disconnecting device disconnects the first connection or the starter, in particular also the starting current limitation system, from the battery in the event of a trigger condition. A higher safety is thereby guaranteed in the event of a crash.

It is also proposed that a voltage drop is measured over the resistor, said voltage drop serving as a trigger condition, particularly if a limit value of the voltage drop has been measured. It is also possible that a start signal is additionally monitored and the trigger condition is satisfied only if no start signal is present but the voltage drop exceeds the limit value. Conversely, if the start signal is present, the voltage drop over the limit value does not result in a trigger condition.

A further aspect is the use of a starting current limitation system, as described above, in a battery starter line of a motor vehicle.

The features described above and below, in particular also the features of the independent and also the dependent claims, can be freely combined with one another, even bypassing the features of the independent claims, and can effectively justify an invention.

BRIEF DESCRIPTION OF THE DRAWINGS

The subject-matter is explained in detail below on the basis of a drawing showing example embodiments. In the drawing.

DETAILED DESCRIPTION OF SPECIFIC EMBODIMENTS

Figure 1:
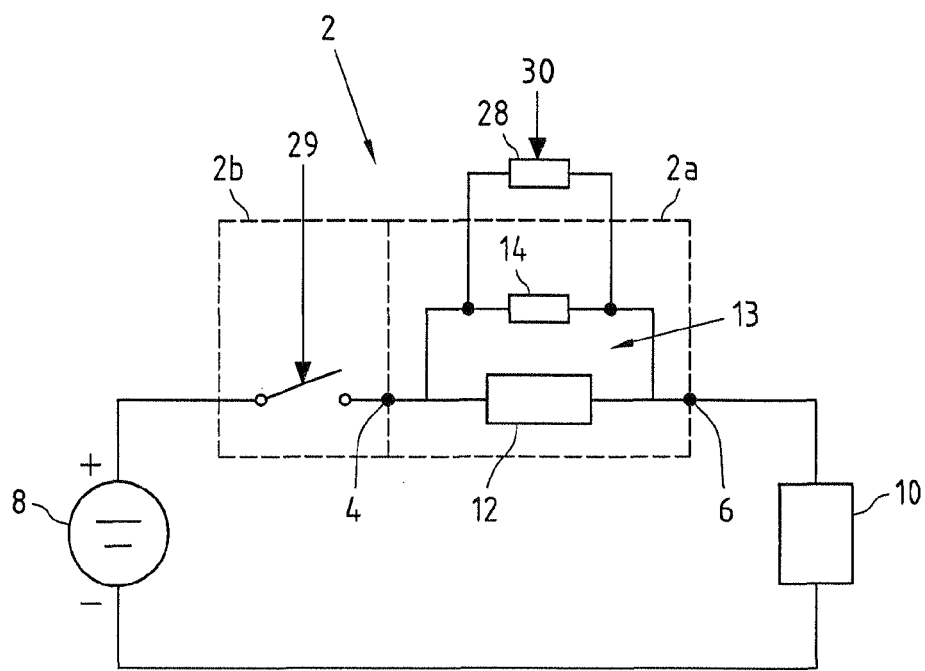
FIG. 1 shows an electrical equivalent circuit of a starting current limitation device according to one example embodiment.

FIG. 1 shows an electrical equivalent circuit of a starting current limitation system 2 with a starting current limitation device 2a and a disconnecting device 2b. It is furthermore shown that the starting current limitation device 2a has a first connection contact 4 and a second connection contact 6. The first connection contact 4 is allocated to an electric battery 8. The second connection contact 6 is allocated to an electric starter motor 10.

FIG. 1 thus shows an electrical starter circuit. The starter current flows in the event of a start from the motor vehicle battery 8, in particular from the positive pole of the battery 8, via the starting current limitation system 2 to the starter 10.

In the event of a start, in the case of both a warm start and a cold start, the starter 10 requires a high electrical power. As a result, the current in the circuit shown from the battery 8 to the starter 10 is very high. Particularly in the case of a warm start, i.e. when auxiliary equipment is already activated, the voltage on the battery poles of the battery 8 must be prevented from dipping. This could cause auxiliary equipment to malfunction. The starting current limitation device 2a is proposed in order to prevent this voltage dip.

The starting current limitation device 2a is formed from a current control device 12 and a resistor 14.

The current control device 12 is preferably formed from a parallel circuit of a plurality of semiconductor components, in particular a plurality of semiconductor switches, in particular a plurality of transistors operated as switches.

The resistor 14 is preferably a low-value resistor which, as a shunt, may also be suitable for measurement purposes.

The parallel circuit comprising the current control device 12 and the resistor 14 forms an oscillating circuit 13 between the connection contacts 4 and 6. The voltage induced in the oscillating circuit is dependent, on the one hand, on the current fluctuation within the oscillating circuit 13 and also on the inductance L of the oscillating circuit 13. The voltage U follows the equation $U = -L(dI/dt)$, where L represents the inductance of the oscillating circuit 13 and $di/dt$ represents the gradient of the current.

Particularly in the case of a pulsed current control by the current control device 12, substantial current fluctuations occur which induce high voltages in the oscillating circuit 13 which must be avoided. The inductance of the oscillating circuit 13 must therefore be designed to be as low as possible, as will be shown below.

In addition, the starting current limitation system 2 has the disconnecting device 2b, which is preferably formed as a pyrotechnic disconnecting device. However, the disconnecting device may also be formed as a fuse or as a semiconductor switch. The disconnecting device 2b serves to disconnect the battery 8 completely from the starting current limitation device 2a and from the starter 10. The disconnecting device 2b is preferably formed as a pyrotechnic device or as a semiconductor switch, and is controlled by a trigger signal 29. The trigger signal 29 may originate from an airbag control device. It is also possible for the trigger signal to be triggered depending on a voltage over the resistor 14.

A control circuit 28 can, for example, measure the voltage drop over the resistor 14. Via an external connection 30, it is possible, for example, to check whether a starter signal, in particular a terminal 50 signal, is present or not. Current may flow over the resistor 14 only if the start signal is present, since only then must the starter 10 be supplied with current. If no start signal is detectable on the connection 30, it can be assumed that no start process is taking place. If a current flows in this case over the resistor 14 and a voltage drop is thus detected with the control circuit 28, a trigger signal 29 can be transmitted to the disconnecting device 2b. The disconnecting device 2b disconnects the electrical connection between the battery 8 and the starter 10, so that no more current can flow.

Figure 2:
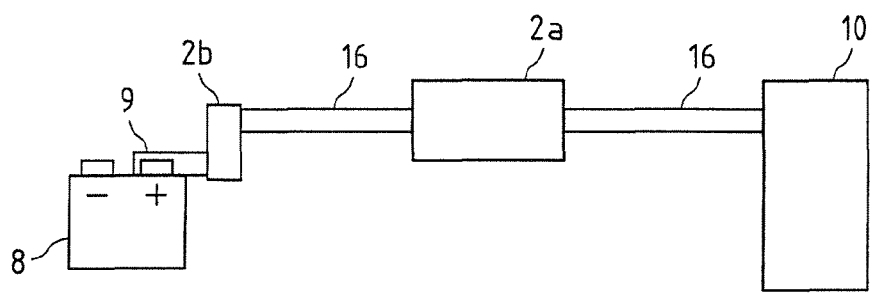
FIG. 2 shows a schematic view of a starting current limitation device with a disconnecting device.

FIG. 2 shows a possible arrangement of the disconnecting device 2b within the starter circuit. FIG. 2 shows schematically the motor vehicle battery 8. A battery pole terminal 9 can be connected to the positive pole of the motor vehicle battery 8. The disconnecting device 2b can be provided directly on the battery pole terminal 9, for example also formed as one piece with the battery pole terminal 9. Here, the disconnecting device 2b may be formed from a first, pyrotechnic part and a second, movable part, as will be explained below. As is evident, the starter line 16, which connects the battery 8 to the starter 10, can thus be disconnected directly on the battery pole terminal 9 by the disconnecting device 2b. In the event of disconnection, the entire starter line 16 is therefore without voltage and current.

Figure 3:
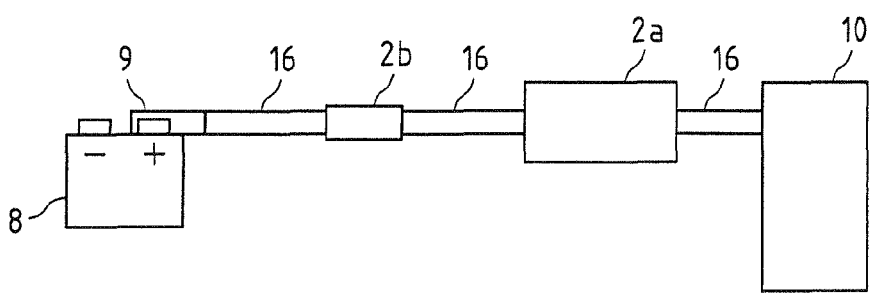
FIG. 3 shows a further schematic view of a starting current limitation device with a disconnecting device.

The starting current limitation device 2a may be disposed directly on the disconnecting device 2b and also on the battery pole terminal 9, and also anywhere else in the starter line 16, as shown in FIG. 3.

FIG. 3 shows a further possible arrangement of the disconnecting device 2b in the starter line 16. It is evident that the disconnecting device 2b is not disposed directly on the battery pole terminal 9, but in the starter line 16 between the battery pole terminal 9 and the starting current limitation device 2a. In the event of disconnection, only the starter line 16 between the disconnecting device 2b and the starter 10 is without current and voltage. The starter line 16 in the area between the battery pole terminal 9 and the disconnecting device 2b remains in contact with the battery. As long as this area is located in a non-critical area of the vehicle, this causes no problems.

Figure 4:
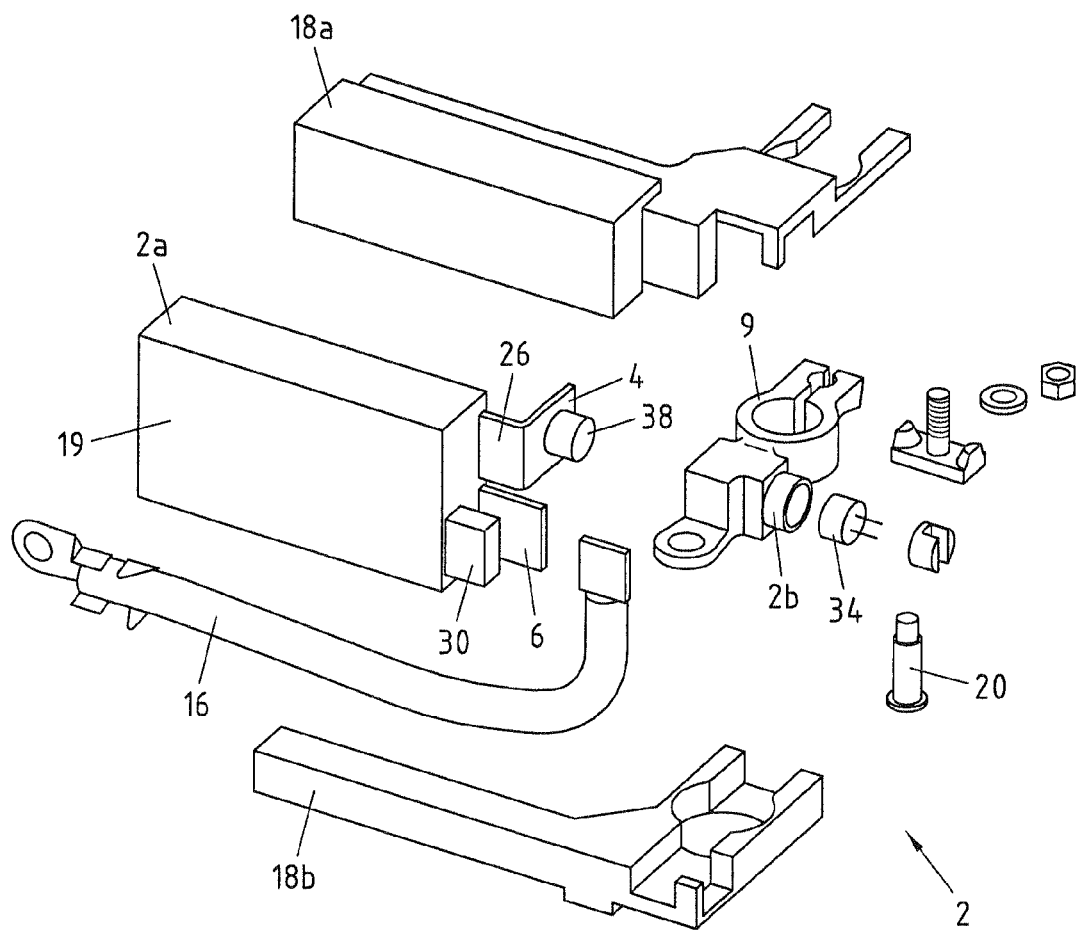
FIG. 4 shows an exploded view of a starting current limitation device according to one example embodiment.

FIG. 4 shows an exploded view of a possible design of the starting current limitation system 2 with a starting current limitation device 2a and a disconnecting device 2b. It is evident that the disconnecting device 2b is formed as one piece with the battery pole terminal 9. As is evident, the disconnecting device 2b can be fitted with a pyrotechnic igniter 34. The igniter 34 is disposed in a shot channel 36 in the disconnecting device 2b. On the other side of the shot channel 36, the connection contact 4 can be formed as a pot or cup 38 and can be fed into the shot channel 36.

In the case of a trigger condition, an ignition signal is transferred via the line 29 to the igniter 34. The igniter 34 then explodes and an overpressure occurs in the shot channel 36. Due to this overpressure, the lug of the connection contact 4 with the pot 38 formed at right angles to the connection part 26 is pressed out of the shot channel and bent. An electrical disconnection of the battery pole 9 from the connection contact 4 takes place as a result.

It is furthermore evident that the connection contact 4 opens out in a first connection part 26. The first connection part 26 is encapsulated with a second connection part (not shown here) 24 in a housing of the starting current limitation device 2*a*. It is furthermore evident that the second connection part 24 opens out in the connection contact 6. The connection contact 6 projects in exactly the same way as the connection 30 from the housing 19. The connection contact 6 is used for the electrical contacting of the starter line 16 with the starting current limitation device 2*a*. The starter line 16 can be welded, soldered or screwed to the connection contact 6.

Figure 5:
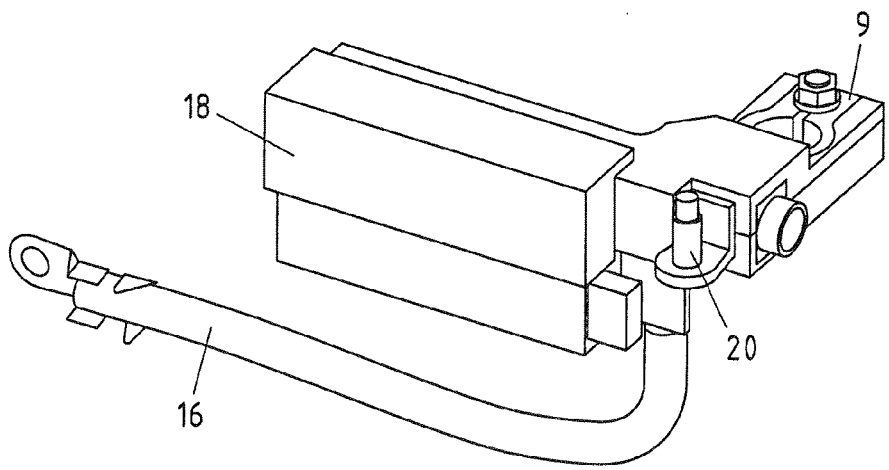
FIG. 5 shows a starting current limitation device in the assembled condition.

The overall starting current limitation system 2 can be encapsulated with a housing 18, as shown in FIG. 5. Furthermore, it is evident in FIG. 5 that an electrical support point 20 is fed out from the housing 18. The electrical support point 20 serves to connect the on-board power supply of the motor vehicle to the battery pole terminal 9 and therefore the battery 8. The support point 20 is not protected by the disconnecting device 2*b* in relation to the battery pole terminal 9, so that, even if the disconnecting device 2*b* is triggered, the support point 20 remains in electrical contact with the battery pole terminal 9. This means that, if the disconnecting device 2*b* is triggered in the event of a short circuit on the starter line 16, the rest of the vehicle can remain in contact with the battery 8 and a separate protection can be implemented here.

Figure 6:
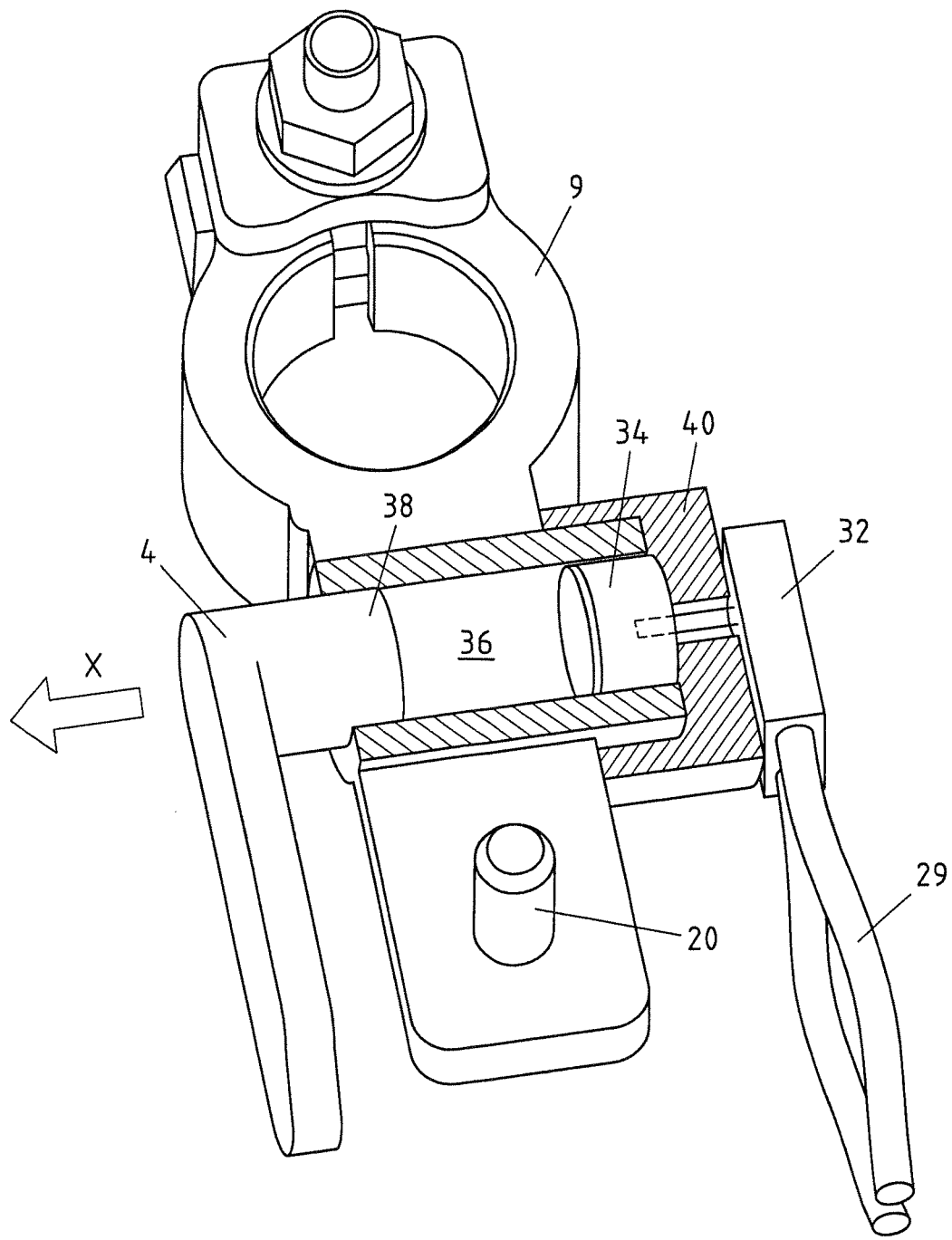
FIG. 6 shows a detail view of a disconnecting device.

The structure of a disconnecting device 2*b* is shown in more detail in FIG. 6. In FIG. 6, the battery pole terminal 9 is shown with the disconnecting device 2*b* in a partially cut open condition.

It is evident that the pyrotechnic igniter 34 is disposed in a shot channel 36. The shot channel 36 is closed on the other side by the pot 38 of the connection contact 4. The shot channel is preferably sealed at least in the area of the igniter 34 by a housing 40. The housing 40 can be moulded around the shot channel 36.

It is furthermore evident that the support point 20 is fed out from the housing 40 and is not protected via the disconnecting device 2*b* in relation to the battery pole terminal 9.

Finally, it is evident that an ignition device 32 can be ignited via an electrical control line 29. The ignition device 32 can be activated either via a signal of an airbag control device or by a signal from the evaluation circuit 28, as already explained above.

In the event of the ignition of the igniter, the pot 38 of the connection 4 is pressed in the direction X out of the shot channel 36. An electrical connection between the battery pole terminal 9 and the connection 6 is interrupted.

FIGS. 7 to 10 show semi-finished components produced during a manufacturing process for a starting current limitation device 2*a*.

Figure 7A:
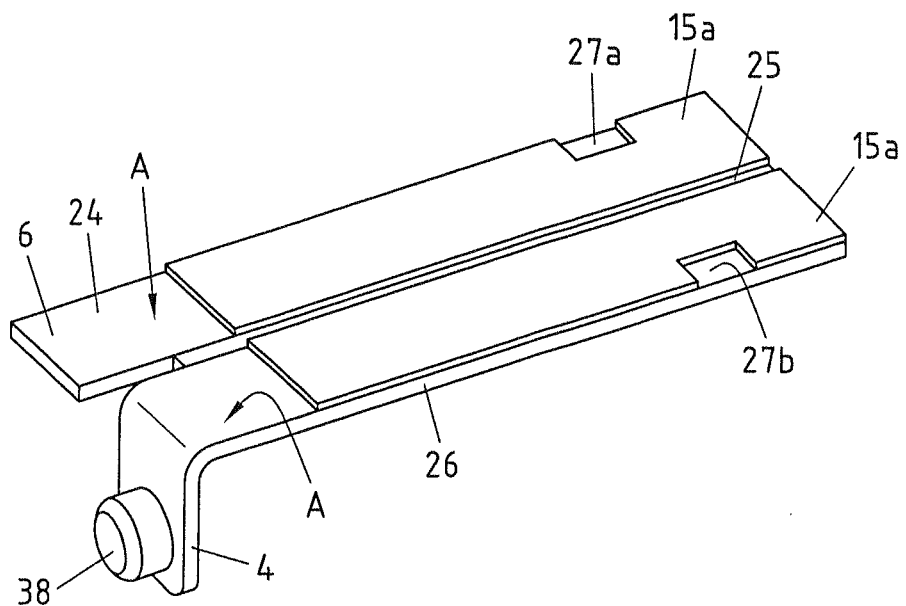
FIG. 7a shows a view of two connection parts during the manufacturing process according to one example embodiment.

Two flat parts, preferably copper plates, are first disposed next to one another as punched/bent parts, as shown in FIG. 7*a*. A gap can be filled with an isolator 25 between the flat parts which form the first connection part 26 and the second connection part 24. The first connection part 26 can be bent so that the connection contact 4 runs in an angular manner, preferably at right angles to the course of the first connection part 26. A pot 38 can be formed on the first connection contact 4 in the punching/bending process.

The connection contact 6 can be formed on one end of the second connection part 24.

It is furthermore evident that an isolator 15*a* is fitted, preferably using a screen printing method, on the surface A of the connection parts 24, 26, except for the connection contacts 4, 6 and the contact areas 27*a*, 27*b*. The isolator 15*a* serves to isolate the connection parts 24, 26 in relation to the resistor 14.

The surface A is the surface of the flat part which will be turned towards the resistor 14.

FIG. 7*a* shows the first connection part 26, which has the connection contact 4 with the pot 38 on its first end and the contact area 27*b* on its second end. Furthermore, FIG. 7*a* shows the second connection part 24, which has the connection contact 6 on its first end and the contact area 27*a* on its second end.

A solder paste can preferably be applied by means of a screen printing method onto the contact areas 27*a, b*.

A connection facility for a current control device 12 can then be provided in the isolator 15*a* which is fitted on the connection parts 24, 26. Contact areas can be milled, drilled or etched into the isolator 15*a* at various places for this purpose.

Figure 7B:
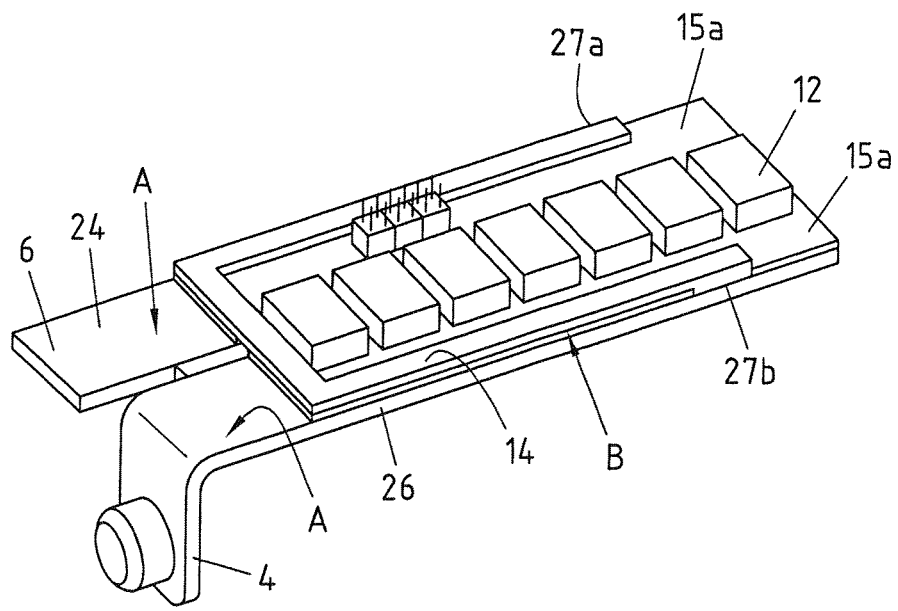
FIG. 7b shows connection parts fitted with a current control device and a resistor according to one example embodiment.

As shown in FIG. 7*b*, the resistor 14 can then first be laid onto the connection parts 24, 26 or the isolator 15*a*. In the example shown, the resistor 14 is U-shaped, and the long legs of the resistor 14 run parallel to the respective connection part 24, 26 and the short leg runs perpendicular hereto. It is furthermore evident that the resistor 14 lies on the isolator 15*a* of the connection parts 24, 26. The resistor 14 is formed as a flat part. The legs of the resistor 14 span an area which runs in a parallel plane to the surface A.

It is also evident that the resistor 14 lies on the connection parts 24, 26 in the contact areas 27*a*, 27*b*. By means of a soldering method, for example in a reflow oven, the resistor 14 can be soldered to the contact areas 27. This produces an electrical connection between the resistor 14 and the connection parts 24, 26 in the area of the contact areas 27.

Figure 11:
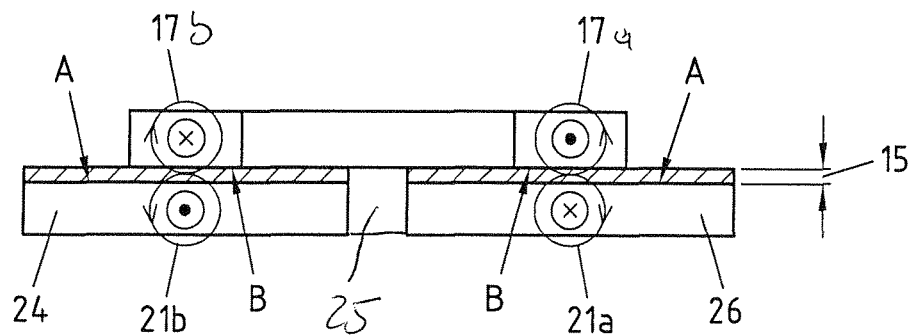
FIG. 11 shows a schematic cross-sectional view through the connection parts and the resistor according to FIG. 7a to show the current directions of the B-field lines.

A cross section through the structure comprising the connection parts 24, 26 and the resistor 14 is shown in FIG. 11. It is evident in FIG. 11 that the resistor 14 lies on the connection parts 24, 26, separated by a gap 15 filled with an isolator 15*a* spaced from the connection parts 24, 26. Furthermore, the current flow directions in the connection parts 24, 26 and the resistor 14 are shown.

It is evident that the current flow directions in the resistor 14 and the respective connection part 24, 26 are opposed to one another. The current flow direction in the connection part 26 is, by way of example, into the drawing plane and, in the resistor 14 in the area of the connection part 26, out of the drawing plane. This is precisely the opposite in the area of the connection part 24, where the current flow direction in the area of the resistor 14 points into the drawing plane and in the area of the connection part 24 points out of the plane.

The reason for this is that, as shown in FIG. 7*b*, the current flows from the connection contact 4 on one end of the connection part 26 to the contact area 27*b* on the other end of the connection part 26. The current then flows from the contact area 27*b* via the resistor 14 in the opposite direction first to the short leg and from there to the contact area 27*a*. The current flows from the contact area 27*a* from the one end of the connection part 24 to the connection contact 6 disposed on the other end of the connection part 24.

Due to the opposing current flow directions, unidirectional B-fields 17, 21 occur in the area of the gap 15 and opposing B-fields 17, 21 occur in the gap filled by the isolator 25. It is evident that the B-field 17*a* due to the current in the resistor 14 is anticlockwise-rotating, whereas the B-field 21*a* is clockwise-rotating. The B-field 17*b* due to the current in the resistor 14 is clockwise-rotating and the B-field 21*b* is in turn anticlockwise-rotating. The B-field lines of the B-fields 17, 21 in the area of the gap 15 are therefore unidirectional, preferably parallel and, in the area of the isolator 25, the B-fields 17*a*, 21*b* and 17*b*, 21*a* are opposing, preferably antiparallel.

Since the current in the resistor 14 may temporarily be slightly smaller than in the connection parts 24, 26, due to the fact that a part of the current may flow via the current control device 12 from the connection part 26 to the connection part 24, the B-fields are not always equally strong. However, the small gap 15 of preferably less than 1 mm, despite the opposing current flow direction in the resistor 14 and the connection parts 24, 26, causes the oscillating circuit 13 to have a low inductance, preferably less than 500 mH.

Figure 8A:
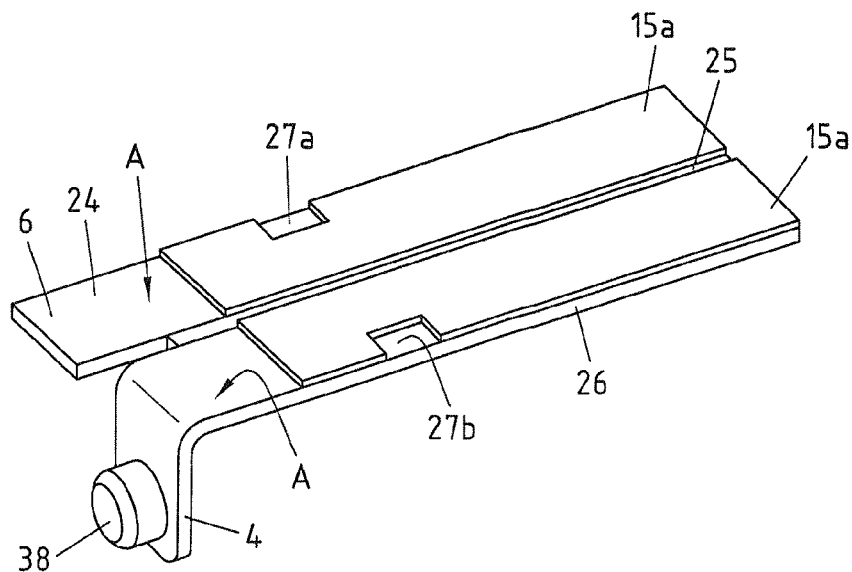
FIG. 8a shows a view of two connection parts during the manufacturing process according to one example embodiment.

FIG. 8*a* shows the first connection 26, which has the connection contact 4 with the pot 38 on its first end, and the contact area 27*b* similarly on this end. Furthermore, FIG. 8*a* shows the second connection part 24, which has the connection contact 6 on its first end and the contact area 27*a* similarly on this end.

The isolator 15*a* is similarly fitted and the contact area 27 is formed, as in FIG. 7*a*.

Figure 8B:
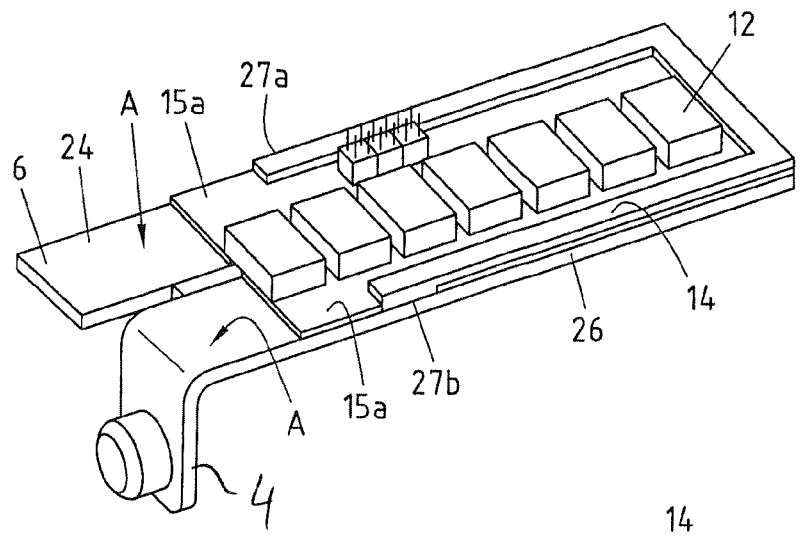
FIG. 8b shows connection parts fitted with a current control device and a resistor according to one example embodiment.

As shown in FIG. 8*b*, the resistor 14 can be laid onto the connection parts 24, 26 or the isolator 15*a*. In the example shown, the resistor 14 is U-shaped, and the long legs of the resistor 14 run parallel to the respective connection part 24, 26 and the short leg runs perpendicular hereto. The opening of the resistor points in the direction of the connection contacts 4, 6. This is precisely the opposite according to the example in FIG. 7*b*. There, the opening of the profile of the resistor points away from the connection contacts 4, 6. It is evident in FIGS. 7*b* and 8*b* that the profile of the resistor 14 encompasses the current control device 12 on three sides.

Figure 12:
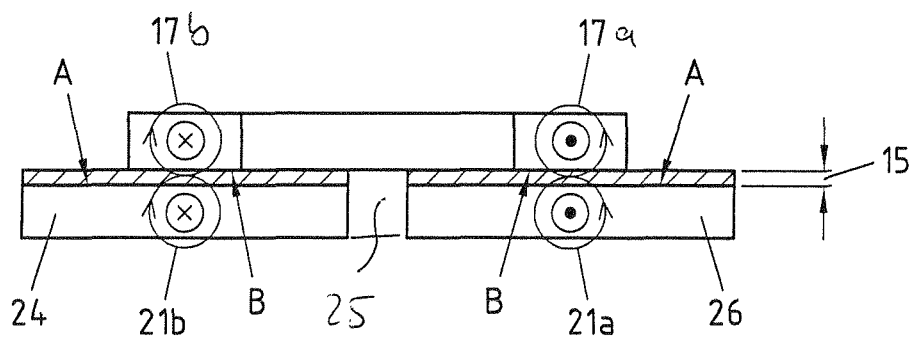
FIG. 12 shows a schematic cross-sectional view through the connection parts and the resistor according to FIG. 8a to show the current directions of the B-field lines.

A cross section through the structure comprising the connection parts 24, 26 and the resistor 14 according to FIG. 8*b* is shown in FIG. 12. It is evident in FIG. 12 that the resistor 14 lies on the connection parts 24, 26, separated by a gap 15 filled with an isolator 15*a* spaced from the connection parts 24, 26. As also according to FIG. 11, a surface B of the resistor 14 points in the direction of the surface A of the connection parts 24, 26. The current flow directions in the connection parts 24, 26 and the resistor 14 are shown in FIG. 12.

It is evident that the current flow directions in the resistor 14 and the respective connection part 24, 26 are unidirectional. The current flow direction in the connection part 26 is, by way of example, out of the drawing plane and, in the resistor 14 in the area of the connection part 26, similarly out of the drawing plane. This is precisely the opposite in the area of the connection part 24, where the current flow direction in the area of the resistor 14 points into the drawing plane and, in the area of the connection part 24, points into the drawing plane out of the plane.

The reason for this is that, as shown in FIG. 8*b*, the current flows from the connection contact 4 on one end of the connection part 26 to the contact area 27*b* on the same end of the connection part 26. Moreover, the current flows along the connection 26 into the current control device 12. The current also flows from the contact area 27*b* via the resistor 14 in the same direction as in the connection part 26 first to the short leg and from there to the contact area 27*a*. The current flows from the contact area 27*a* from the resistor to the connection contact 6. The current flows in the connection part 24 from the current control device 12 similarly in the direction of the connection contact 6 and therefore similarly in the same direction.

Due to the unidirectional current flow directions, opposing B-fields 17, 21 occur in the area of the gap 15 and unidirectional B-fields 17, 21 occur in the gap filled by the isolator 25. It is evident that the B-field 17*a* due to the current in the resistor 14 and the B-field 21*a* are anticlockwise-rotating. The B-field 17*b* due to the current in the resistor 14 and the B-field 21*b* are anticlockwise-rotating. The B-field lines of the B-fields 17, 21 in the area of the gap of the isolator 25 are therefore preferably parallel and, in the area of the gap 15, the B-fields 17*a*, 21*b* and 17*b*, 21*a* are opposing, preferably antiparallel.

Figure 8C:
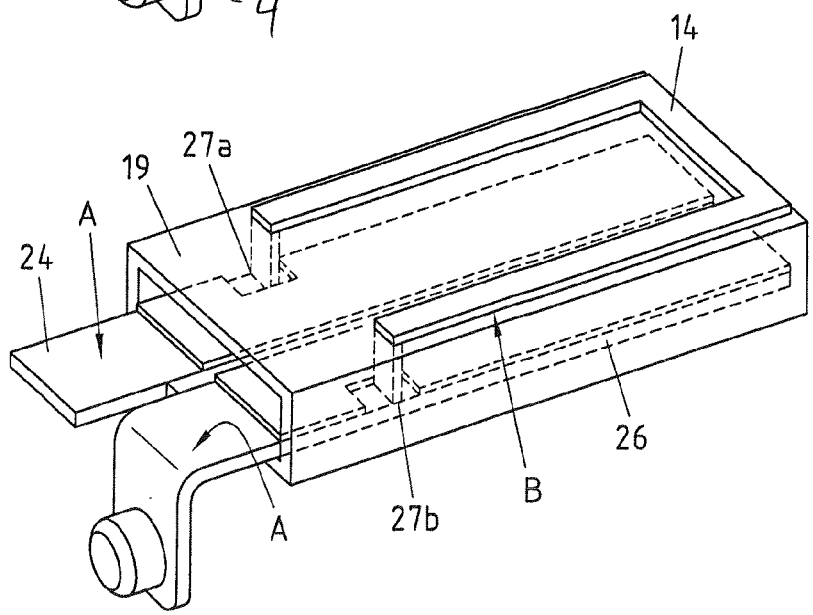
FIG. 8c shows a further possible arrangement of a resistor on the connection parts according to one example embodiment.

FIG. 8*c* shows a structure similar to that shown in FIG. 8*b*, but it is evident that the current control device 12 is encapsulated with the connection parts 24, 26 in the housing 19, and the resistor 14, contacted via the contact areas 27, is disposed outside the housing 19.

Figure 9A:
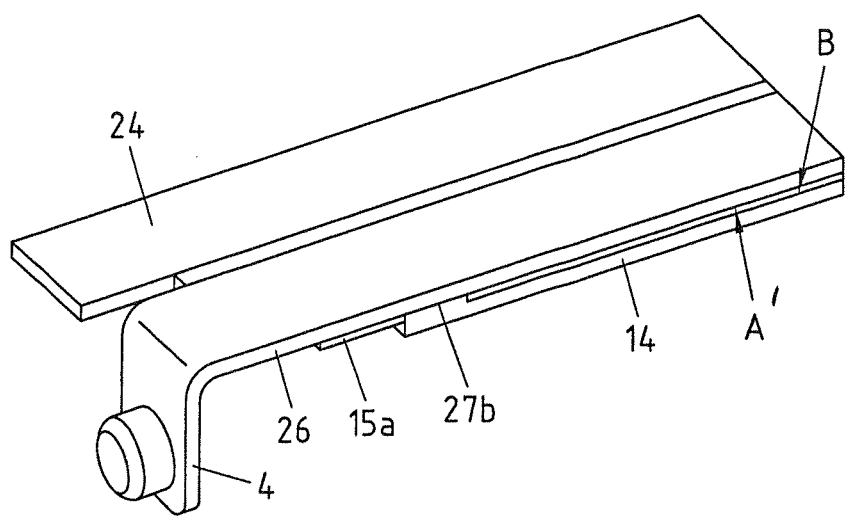
FIG. 9a shows an additional possibility for connecting the resistor to the connection parts according to one example embodiment.

FIG. 9*a* shows a structure similar to that shown in FIG. 8*b*, but here the resistor 14 is disposed on the surface A' of the connection parts 24, 26 facing away from the current control device 12.

Figure 9B:
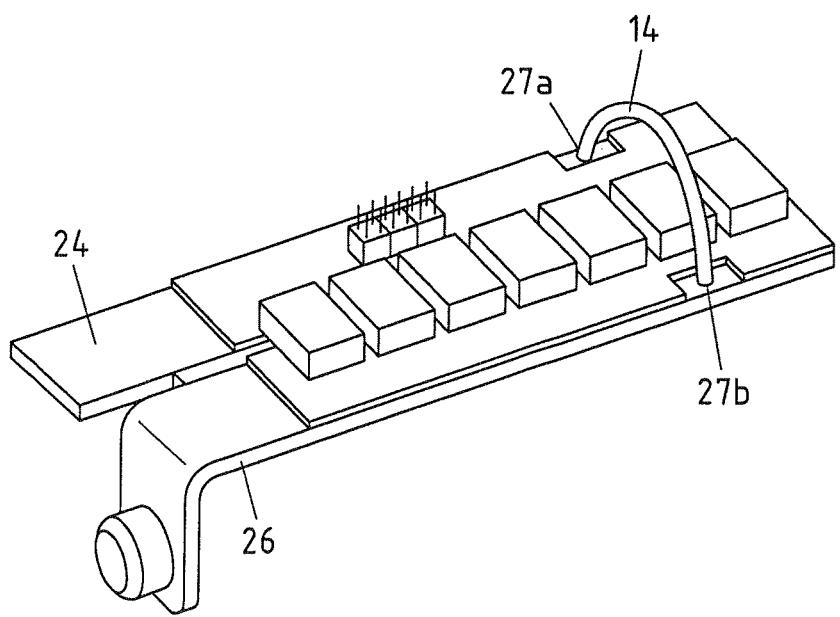
FIG. 9b shows an additional possibility for connecting the resistor to the connection parts according to one example embodiment.

FIG. 9*b* shows a structure similar to that shown in FIG. 8*b*, but wherein the resistor 14 is not formed here by a U-shaped metal sheet, but rather as a cable disposed between the contact areas 27.

Figure 10:
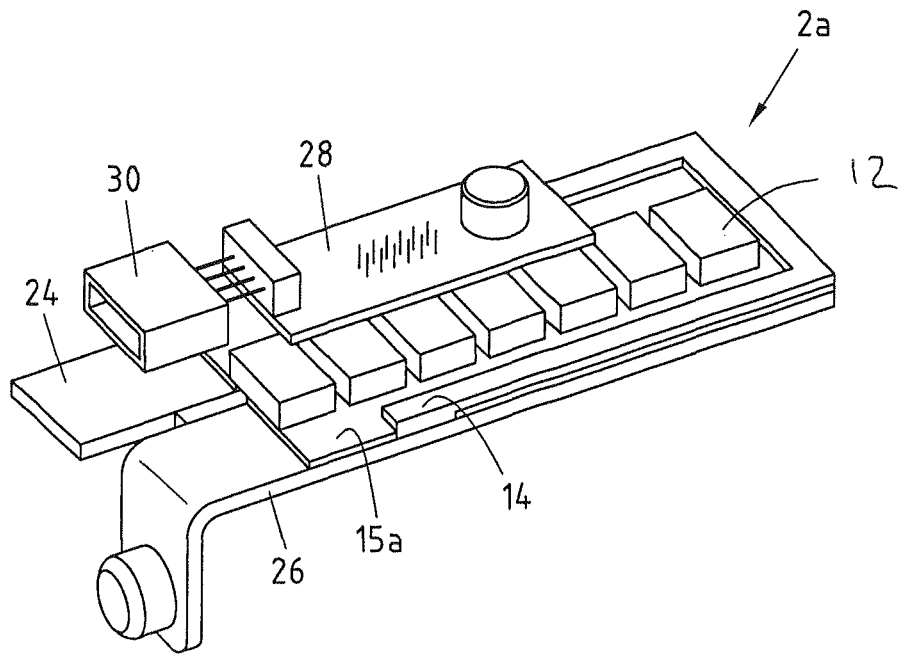
FIG. 10 shows a view of connection parts with a resistor, starting current control device and evaluation device.

FIG. 10 shows the structure of the starting current limitation device 2*a* in a further advanced stage. It is evident that the control circuit 28 is provided above the resistor 14. The control circuit 28 can, on the one hand, serve to evaluate the voltage over the resistor 14 and therefore generate a control signal 29 via the connection 30 to control the disconnecting device 2*b*.

In addition, a control signal, with which the semiconductor switches in the current control device 12 of the starting current limitation device 2*a* can be controlled, can be received in the control circuit 28 via the connection 30. In particular, a pulsed operation of the semiconductor switches can take place. The electrical energy transferred from the battery 8 to the starter 10 can be regulated by means of a pulse-width-modulated starting current, so that the start process of the starter 10 can take place in a controlled manner.

On the other hand, the current control device 12 can be opened completely via the control circuit 28, so that, particularly at the beginning of a start process, preferably in the first 10, 20, 30, 40 or 50 ms, the current flows entirely via the resistor 14. Only subsequently can a closure of the semiconductor switches of the current control device 12 take place, wherein the semiconductor switches are opened and closed in a pulsed manner, particularly using a pulse-width-modulated method, so that the current can also flow partially via the current control device 12.

By means of the device shown, the starter line and the starter can be switched so that they are without current and voltage in the event of a crash. Furthermore, the starting current can be limited and semiconductors of a starting current limitation device can simultaneously be protected against overcurrents. In addition, the induced voltages can be minimised in the starting current limitation system, and finally a thermal symmetrisation and therefore an effective heat removal can be implemented.

What is claimed is:

1. A starting current limitation system comprising:
a first electrical connection element connectable to a motor vehicle battery pole;
a second electrical connection element connectable to a starter, wherein the two electrical connection elements open out into metal sheets disposed parallel to one another and electrically isolated from one another via a gap;
a parallel circuit connected between the first connection element and the second connection element, the parallel circuit including a branch with a current control device and a branch with an electrical resistor, in such a way that, at the beginning of a warm start of the motor vehicle, a starter current is conducted via the resistor and after the beginning of the warm start, the starter current is conducted via the current control device and the resistor at the same time, and the current control device controls the starting current after the beginning of the warm start in a linear mode or a mode including a series of pulses; and
wherein the resistor and/or the current control device electrically contacts the metal sheets with one another via the gap.

2. The starting current limitation system of claim 1, wherein the current control device is opened at the beginning of the warm start and/or that the current control device is at least temporarily closed at the beginning of a cold start.

3. The starting current limitation system of claim 1, wherein the current control device is at least temporarily closed after the beginning of the warm start.

4. The starting current limitation system of claim 1, wherein the current control device has at least one semiconductor.

5. The starting current limitation system of claim 1, wherein the branch with the resistor has entirely passive components and the resistor is formed from a resistor material or as an electrical cable.

6. The starting current limitation system of claim 1, wherein the branch with the resistor is connected in parallel with the current control device with an inductance of one of (a) less than 500 mH; (b) less than 100 mH; (c) less than 50 mH.

7. The starting current limitation system of claim 1, wherein the resistor has a current-carrying capacity of one of (a) more than 100 A; (b) more than 250 A; (c) more than 500 A.

8. The starting current limitation system of claim 1, further comprising a disconnecting element disposed in series with the parallel circuit wherein the disconnecting element disconnects the electrical connection with the motor vehicle battery pole depending on a trigger signal.

9. The starting current limitation system of claim 8, wherein the trigger signal is receivable by an airbag control device or in that the trigger signal is dependent on a voltage measurement device measuring the voltage over the resistor.

10. The starting current limitation system of claim 8, wherein the trigger signal is dependent on a start signal or a starter control_ signal.

11. The starting current limitation system of claim 1, wherein the connections, the resistor and the current control device are at least partially encapsulated in a common housing.

12. The starting current limitation system of claim 11, wherein the housing is disposed on a pole recess of a motor vehicle battery.

13. The starting current limitation system of claim 12, wherein the resistor is formed as a shunt.

14. The starting current limitation system of claim 1, wherein at least one of the connection elements forms a projection or a pot, in such a way that the projection corresponds to a recess of a pyrotechnic disconnecting element.

15. The starting current limitation system of claim 14, wherein the recess of the pyrotechnic disconnecting element is formed as one piece with a battery pole terminal.

16. A method of starting current limitation comprising operating the system of claim 1 in a battery starter line of a motor vehicle.

17. A starting current limitation system comprising:
a first electrical connection element connectable to a motor vehicle battery pole;
a second electrical connection element connectable to a starter; and
a parallel circuit connected between the first connection element and the second connection element, the parallel circuit including a branch with a current control device and a branch with an electrical resistor, in such a way that, at the beginning of a warm start of the motor vehicle, a starter current is conducted via the resistor and after the beginning of the warm start, the starter current is conducted via the current control device and the resistor at the same time, wherein the two connection elements open out into metal sheets disposed parallel to one another and electrically isolated from one another via a gap, wherein the resistor and/or the current control device electrically contacts the metal sheets with one another via the gap.

* * * * *